United States Patent
Roth et al.

(10) Patent No.: US 12,248,320 B2
(45) Date of Patent: Mar. 11, 2025

(54) SYSTEM AND METHOD FOR REMOVING DEBRIS FROM A STORAGE FACILITY

(71) Applicant: Walmart Apollo, LLC, Bentonville, AR (US)

(72) Inventors: Brian C. Roth, Bentonville, AR (US); Paul E. Durkee, Centerton, AR (US); James Benjamin Edwards, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 274 days.

(21) Appl. No.: 18/081,105

(22) Filed: Dec. 14, 2022

(65) Prior Publication Data
US 2023/0120098 A1   Apr. 20, 2023

Related U.S. Application Data (63) Continuation of application No. 16/995,273, filed on Aug. 17, 2020, now Pat. No. 11,579,608.

(60) Provisional application No. 62/890,463, filed on Aug. 22, 2019.

(51) Int. Cl.
*G05D 1/00* (2024.01)
*A47L 7/00* (2006.01)
*A47L 9/00* (2006.01)
*A47L 9/28* (2006.01)
(Continued)

(52) U.S. Cl.
CPC .......... *G05D 1/0088* (2013.01); *A47L 7/0085* (2013.01); *A47L 9/009* (2013.01); *A47L 9/281* (2013.01); *A47L 9/2852* (2013.01); *A47L 9/2894* (2013.01); *G01C 21/206* (2013.01); *G05B 19/042* (2013.01);
(Continued)

(58) Field of Classification Search
CPC .. G05D 1/0088; G05D 1/0212; G05D 1/0287; G05D 1/0225; G05D 1/0282; A47L 7/0085; A47L 9/009; A47L 9/281; A47L 9/2852; A47L 9/2894; A47L 2201/04; G01C 21/206; G05B 19/042; G05B 2219/2614
See application file for complete search history.

(56) References Cited

U.S. PATENT DOCUMENTS

| 5,089,037 A | 2/1992 | Marsolais |
| 7,113,847 B2 | 9/2006 | Chmura |
| 8,387,193 B2 | 3/2013 | Ziegler |

(Continued)

FOREIGN PATENT DOCUMENTS

| CN | 203005493 | 6/2013 |
| WO | 2005118435 | 12/2005 |

OTHER PUBLICATIONS

Robotique Et Mathématiques—6ème; "Robots Kiva : Amazon"; https://www.youtube.com/watch?v=ULswQgd73Tc; published on Jul. 24, 2017; pp. 1-11.

(Continued)

*Primary Examiner* — Bhavesh V Amin
(74) *Attorney, Agent, or Firm* — Fitch, Even, Tabin & Flannery LLP (57) ABSTRACT

Autonomous carriers or totes that include vacuum units are provided. As the totes move or are moved through a warehouse carrying products, they collect debris. The debris can be analyzed at the tote, and actions can be performed based upon the analysis.

20 Claims, 8 Drawing Sheets

(51) Int. Cl.
*G01C 21/20* (2006.01)
*G05B 19/042* (2006.01)

(52) U.S. Cl.
CPC ......... *G05D 1/0212* (2013.01); *G05D 1/0287* (2013.01); *A47L 2201/04* (2013.01); *G05B 2219/2614* (2013.01)

(56) References Cited

U.S. PATENT DOCUMENTS

| | | |
|---|---|---|
| 10,123,674 B2 | 11/2018 | Gordon |
| 10,130,232 B2 | 11/2018 | Atchley |
| 11,579,608 B2 | 2/2023 | Roth |
| 2004/0038641 A1 | 2/2004 | Kawano |
| 2006/0020369 A1 | 1/2006 | Taylor |
| 2016/0260161 A1 | 9/2016 | Atchley |
| 2018/0070787 A1 | 3/2018 | Gordon |
| 2018/0177367 A1 | 6/2018 | Amaral |
| 2018/0279835 A1 | 10/2018 | He |
| 2021/0055729 A1 | 2/2021 | Roth |
| 2022/0187847 A1 | 6/2022 | Cella |
| 2022/0197306 A1 | 6/2022 | Cella |
| 2023/0120098 A1* | 4/2023 | Roth ................... G05D 1/0088 701/25 |

OTHER PUBLICATIONS

U.S. Appl. No. 16/995,273; Notice of Allowance and Fees Due (PTOL-85) mailed Sep. 19, 2022; (pp. 1-8).

* cited by examiner

SYSTEM AND METHOD FOR REMOVING DEBRIS FROM A STORAGE FACILITY

CROSS-REFERENCE TO RELATED APPLICATION

This application is a continuation application of U.S. application Ser. No. 16/995,273, filed Aug. 17, 2020, which claims the benefit of U.S. Provisional Application No. 62/890,463, filed Aug. 22, 2019, both of which are incorporated herein by reference in their entireties.

TECHNICAL FIELD

These teachings relate to the removal of debris from warehouses and other facilities where products are stored.

BACKGROUND

Warehouses and other storage facilities store products, parts, components, and other items. Sometimes debris enters the facility. Debris may include dust, smoke, or contaminants to mention a few examples. The debris may make it sometimes difficult and, in some cases, hazardous for humans or automated vehicles to retrieve warehouse items.

One type of storage facility utilizes automated storage and retrieval systems (ASRSs). The ASRS manages the retrieval and movement of products (or other items) within the facility. For efficiency, these types of facilities are usually densely packed making it especially difficult and/or expensive for humans or large automated vehicles to remove debris from these types of facilities.

BRIEF DESCRIPTION OF THE DRAWINGS

The above needs are at least partially met through the provision of approaches for debris collection and/or analysis in a warehouse or similar facility, wherein.

DETAILED DESCRIPTION

Generally speaking, autonomous carriers or totes that include vacuum units are provided. As the totes move or are moved through a warehouse carrying products, they simultaneously collect debris. The debris can also be analyzed at the tote, and actions can be performed based upon the analysis.

In aspects, an autonomous carrier (vacuum tote) is designed and dimensioned such that it matches the dimensions of the standard storage and order fulfilment totes, so, for example, it can fit into existing automated carts or other vehicles/movement mechanisms. In aspects and by placing this item on or in an automated cart (or other vehicle), the cart becomes a cleaning machine while simultaneously fulfilling orders, moving products, and performing other duties or functions it has within a warehouse.

In other aspects, the ASRS may instruct that totes are used in a "cleaning mode." A tote that includes a vacuum unit is brought to a specified location as efficiently as possible, and, while in cleaning mode, the automated system moves this cleaning tote continuously along a path over as many points as possible, cleaning as it goes. Once filled with debris (e.g., the compartment where the debris is stored is filled as indicated by internal sensors), the tote empties and cleans itself.

In some other aspects, a port is disposed at the tote that allows the tote to dock to a specific location within the ASRS facility where the debris obtained by the vacuum unit can be emptied. In this way, the tote doesn't need to be fully ejected/dispensed/removed from the ASRS facility to be emptied. The location of the port may also serve as the storage location for the tote when it is not being used.

In yet other aspects, the storage locations for totes may have air ducts for supplying cool air that keeps certain fresh items stored at that location cool. In aspects, the vacuum tote is able to dock to the air ducts and allow cool, clean air to be blown or forced into the vacuum tote.

In examples, the tote includes a vacuum unit and onboard power to run the vacuum unit. In aspects, onboard power is replenished through a battery swap at a home base of the tote, electrical contacts on the home base, cart or ASRS internal crane, or wireless charging at these locations. Alternatively, it may be able to sap power from the shuttling system bots' batteries when being transported around the ASRS facility, or from the grid through electrical contact via the shuttling bot.

In still other aspects, the debris can be analyzed for a variety of different characteristics. For example, the existence of moisture can be used to detect conditions for bacterial growth and possibly trigger a different kind of cleaning or other follow-up action such as investigating the operation of a heating ventilation and air conditioning (HVAC) system operating at the warehouse. Temperature of the debris can also be analyzed for conditions for that might lead to bacterial growth, fire, or to trigger some follow-up action. Known pathogens such as E. coli, Listeria, or black mold may also be detected. The detection of a certain characteristic may trigger lockdown of a facility, quarantine of a facility, or cancellation of stored orders and sending replacement orders to a nearby separate storage areas.

In other examples, the dust intake rate may analyzed to determine if follow-up cleans are necessary. In still other examples, known gases associated with certain decomposition to locate spoilage in the ASRS facility or store (e.g., ethylene) may be detected and appropriate action taken. In still other examples, smoke/ozone may be detected indicating fires or electrical problems. Alerts may be issued, or authorities may be autonomously called. Other examples are possible.

In other aspects, cameras (e.g., also including lights) at the tote may be used to record events of significance for humans. The videos can be reviewed either manually or automatically to investigate any issue. In some examples, a video is initiated or still image obtained any time a significant event (e.g., the detection of any of the above-mentioned debris) occurs.

In many of these embodiments, a system for removing debris from a product storage facility includes a plurality of pathways and a first autonomous carrier. The product storage facility includes a plurality of product storage units that hold products, and the products are of multiple and different types. The plurality of pathways are disposed throughout the storage facility. The pathways extend between or around the product storage units.

The first autonomous carrier is configured to independently traverse selected ones of the plurality of pathways. The first autonomous carrier is configured to carry products to and from selected ones of the product storage units. The first autonomous carrier includes multiple storage spaces for holding different types of the products. The first autonomous carrier also includes a vacuum unit. The vacuum unit is configured to remove debris from the pathways as the first autonomous carrier traverses the pathways as it carries the products.

In aspects, the vacuum unit of the first autonomous carrier is further configured to analyze characteristics of the debris, determine an action to take based upon the analysis, and take the action. The action is one or more of sending an alert message to an employee of the product storage facility, moving selected one of the products within the facility, or sending a control signal to control an environmental control apparatus within the facility. Other examples are possible.

In examples, the system further includes a second autonomous carrier. The second autonomous carrier is of the same dimensions and form factor as the first autonomous carrier. In aspects, the second autonomous carrier includes a second vacuum unit and does not include any space for carrying products.

In other examples, the first autonomous carrier includes a propulsion unit to cause the first autonomous carrier to traverse the pathways.

In still other examples, the characteristics of the debris include the smoke content of the debris, the mold content of the debris, the ozone content of the debris, or the bacteria content of the debris. Other examples are possible.

In other aspects, at least some of the pathways include conveyor belts. In still other aspects, the pathways include portions of a floor. In yet other aspects, the pathways included an elevated mezzanine and transport rail structure.

In other examples, the first autonomous carrier includes a sensor and the sensor is configured to obtain an environmental characteristic. The environment characteristic is a temperature, a pressure, or a humidity, wherein the vacuum unit determines whether the sensed characteristic is within a predetermined acceptable range, and when the predetermined characteristic is not within the predetermined acceptable range, alert the employee of the product storage facility.

In others of these embodiments, an approach for removing debris a product storage facility includes providing a product storage facility, the product storage facility including a plurality of product storage units that hold products, the products being of multiple types.

A plurality of pathways that are disposed throughout the storage facility are provided. The pathways extend between or around the product storage units.

A first autonomous carrier that is configured to traverse the plurality of pathways is also provided. The first autonomous carrier is configured to carry products to and from selected ones of the product storage units. The first autonomous carrier includes multiple storage spaces for holding different types of the products. The first autonomous carrier also includes a vacuum unit. The vacuum unit is configured to remove debris from the pathways as the first autonomous carrier traverses the pathways as it carries the products.

In other aspects and at the vacuum unit of the first autonomous, characteristics of the debris are analysed. An action to take is determined based upon the analysis and the action is taken. The action is one or more of sending an alert message to an employee of the product storage facility, moving selected one of the products within the facility, or sending a control signal to control an environmental control apparatus within the facility. Other examples are possible.

In much of the description provided herein, the term "carrier" and "tote" are used to describe the units where the vacuum unit is disposed. It will be appreciated that the terms "carrier" and "tote" are interchangeable as used herein.

Figure 1:
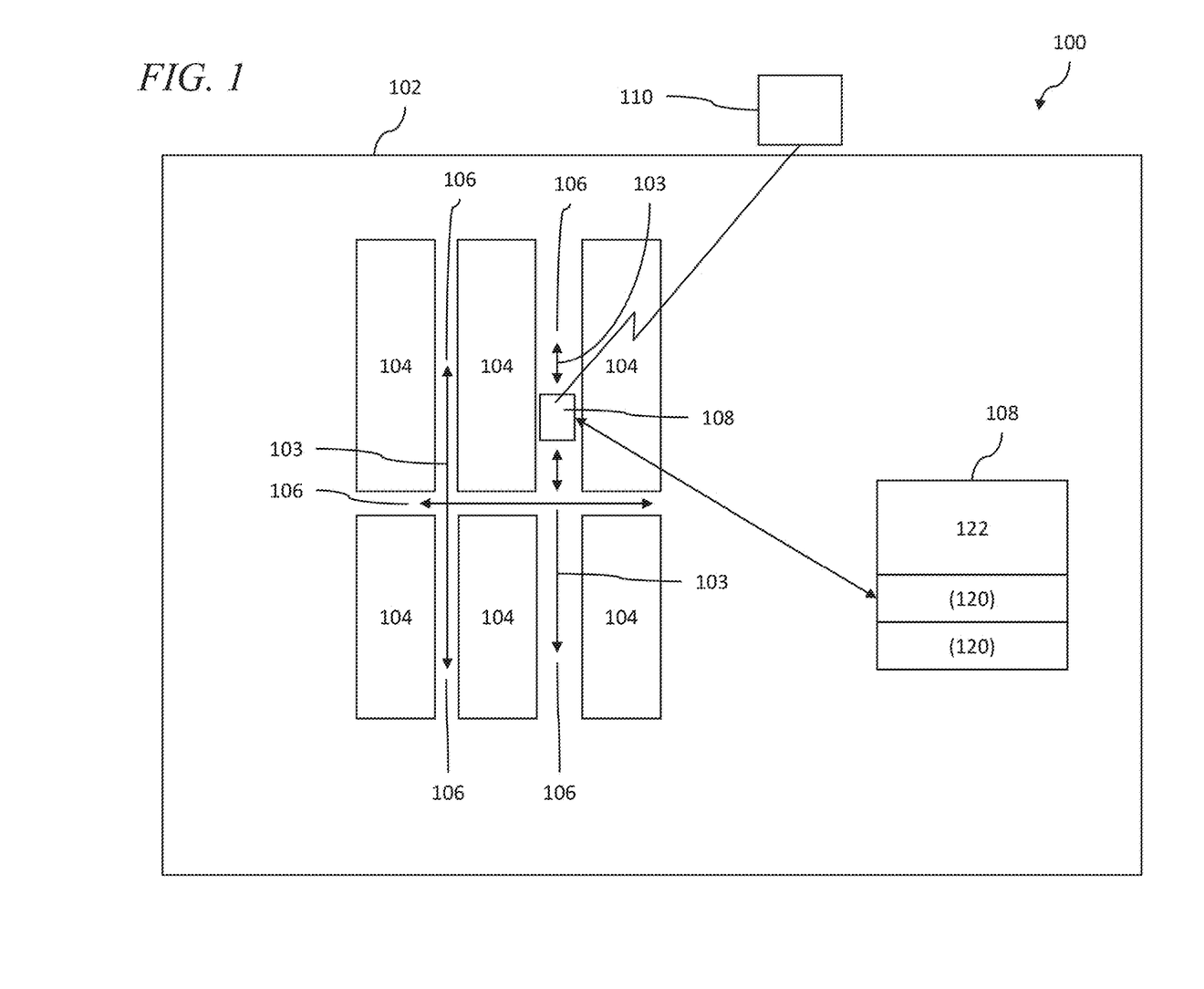
FIG. 1 comprises a diagram of a system as configured in accordance with various embodiments of these teachings.

Referring now to FIG. 1, a system 100 for removing debris from a warehouse 102 (or similar facility) is described. The warehouse 102 includes product storage units 104 and pathways 106 between or around the product storage units 104.

The product storage facility includes the plurality of product storage units 104 that hold products, the products being of multiple types. The plurality of pathways 106 are disposed throughout the storage facility, and the pathways 106 extend between or around the product storage units 104.

A first autonomous carrier 108 is configured to independently traverse selected ones of the plurality of pathways. The first autonomous carrier 108 may include a propulsion system (or be integrated into another platform that has a propulsion system). In one aspect, the first autonomous carrier 108 includes a control circuit that allows the carrier to navigate to a destination without human input (or control provided by some external or centralized controller). In this case, the first autonomous carrier 108 may find an optimum path and avoid obstacles. Some movements of the first autonomous carrier 108 along the pathways 106 are indicated by the arrows labelled 103.

The first autonomous carrier 108 (or a platform or vehicle carrying the carrier 108) is configured to carry products to and from selected ones of the product storage units 104. In these regards, the first autonomous carrier 108 includes multiple storage spaces 120 for holding different types of the products. As mentioned, the first autonomous carrier 108 also includes a vacuum unit 122. The vacuum unit 122 is configured to remove debris from the pathways as the first autonomous carrier 108 traverses the pathways 106 as it carries the products.

The first autonomous carrier 108 may include a propulsion unit that allows the first autonomous carrier 108 to move under its own power through the pathways 106. The first autonomous carrier 108 may be integrated into a cart, shuttle, or other similar device or vehicle that includes wheels that allows the carrier to move along the pathways 106.

In aspects, the vacuum unit 122 of the first autonomous carrier 108 is further configured to analyze characteristics of the debris, determine an action to take based upon the analysis, and take the action. In aspects, a control circuit (described in greater detail below) may be used to perform the analysis. The action is one or more of sending an alert message to an employee of the product storage facility, moving selected one of the products within the facility, or sending a control signal to control an environmental control apparatus within the facility. Other examples are possible.

In one example, the warehouse 102 may implement an ASRS system. In aspects, shuttles may carry the first autonomous carrier 108. The product storage units 104 are racks and lifts are provided to allow vertical movement of a shuttle from one level to another level. In this case, the pathways 106 are at multiple levels or planes. In such an approach, horizontal movement of the shuttle is accomplished by independent shuttles each operating on one level of the rack while the lift (at a fixed position within the rack) is responsible for the vertical movement of the shuttle.

A control circuit 110 may be disposed at a central location or at the warehouse 102. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

In aspects, the control circuit 110 implements an automated storage and retrieval system (ASRS). The control circuit 110 may inform the carrier 108 (or platform/vehicle carrying the carrier 108) of a product to move (or retrieve) and allow the carrier 108 (e.g., as integrated with another vehicle or propulsion unit) to independently navigate to retrieve the product. In other examples, the control circuit 110 may inform the carrier 108 of where the product is and the carrier 108 (or platform/vehicle carrying the carrier 108) independently navigates to the destination to retrieve the product. In other examples, the control circuit 110 controls the operation of a mechanism (e.g., a conveyor belt) that move the carrier to the destination. In yet other examples, the carrier 108 controls the operation of a mechanism (e.g., a conveyor belt) that moves the carrier 108 to the destination.

Figure 2:
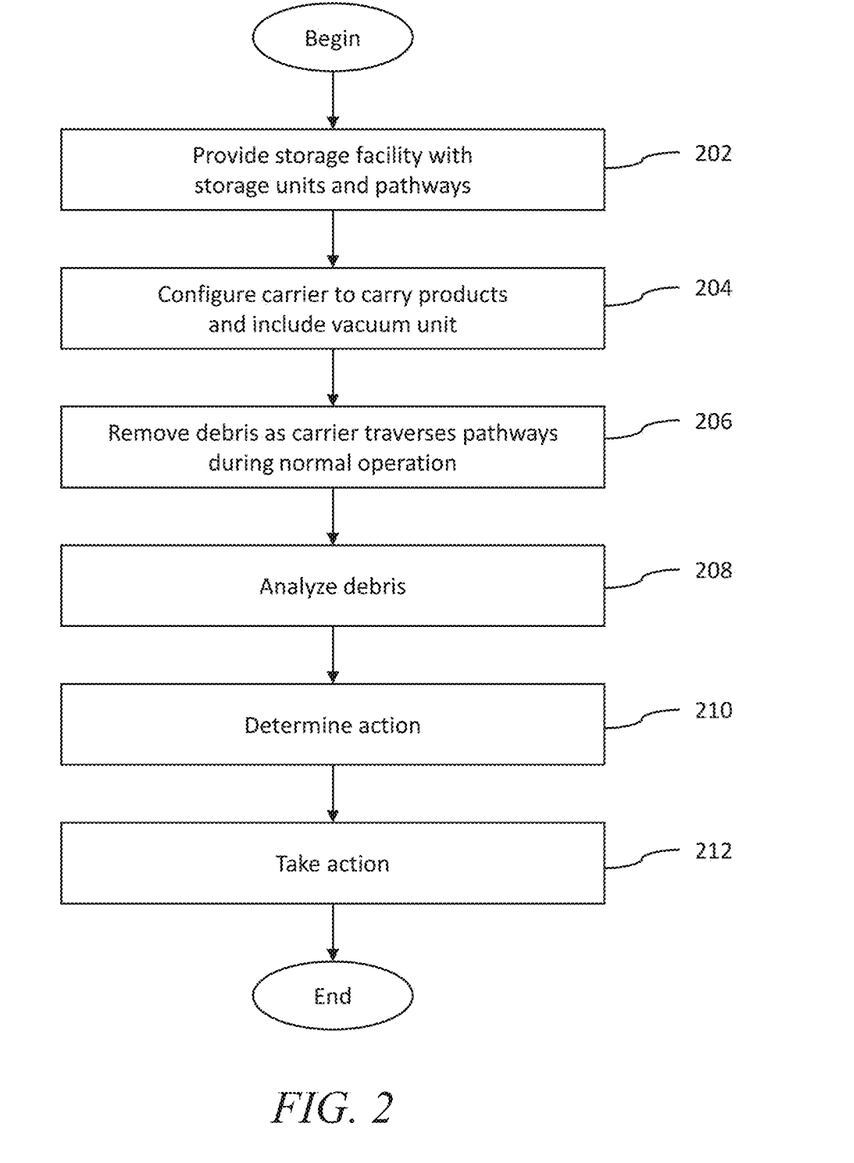
FIG. 2 comprises a flowchart as configured in accordance with various embodiments of these teachings.

Referring now to FIG. 2, an approach for removing debris from a warehouse or similar facility is described.

At step 202, a product storage facility is provided that includes a plurality of pathways disposed between product storage units. The plurality of product storage units hold products and the products are of multiple types. In aspects, the facility is a densely packed facility and an automated storage and retrieval system (ASRS) is implemented at the facility. As described elsewhere herein, the storage facility may be structured with trollies, shuttles, shelving units, conveyor belts, and other elements. These may be arranged at one or more vertical levels.

At step 204, a first autonomous carrier is configured to traverse the plurality of pathways is also provided. The first autonomous carrier is configured to carry products to and from selected ones of the product storage units. The first autonomous carrier includes multiple storage spaces for holding different types of the products. The first autonomous carrier also includes a vacuum unit. The vacuum unit is any type of vacuuming device that removes any type of debris from the storage facility. The carrier may be included within or carried by some other vehicle or platform (e.g., shuttle or conveyor belt).

At step 206, the vacuum unit of the carrier removes debris as the first autonomous carrier traverses the pathways as it carries the products. The carrier may also include a debris storage area or compartment where the debris is stored and/or analysed.

At step 208 and at the vacuum unit of the first autonomous carrier, characteristics of the debris are analysed. Analysis may include performing various types of testing on the debris such as visually analysing the debris (e.g., using a camera to take pictures of the debris and automatically analysing the contents of the debris, for example, using a machine learning model), and/or performing chemical tests on the debris (e.g., applying various chemicals or other additives and analysing the reaction of the debris). Other examples of testing and testing procedures are possible.

At step 210, an action to take is determined based upon the analysis and the action is taken. Once the analysis is complete, an action can be determined at the carrier. The carrier may have a transceiver unit where the action can be communicated to other entities (e.g., other control circuits, a central controller, other autonomous carriers, vehicles, supervisory personnel to mention a few examples). In other examples, the results of the analysis are transmitted to another control circuit or controller, which determines the action to take.

In examples, the action is one or more of sending an alert message to an employee of the product storage facility, moving selected one of the products within the facility, or sending a control signal to control an environmental control apparatus within the facility. Other examples of actions are possible.

At step 212, the action is taken. In examples, a message may be transmitted, or an electronic control signal is send causing some other entity to perform some function.

Figure 3:
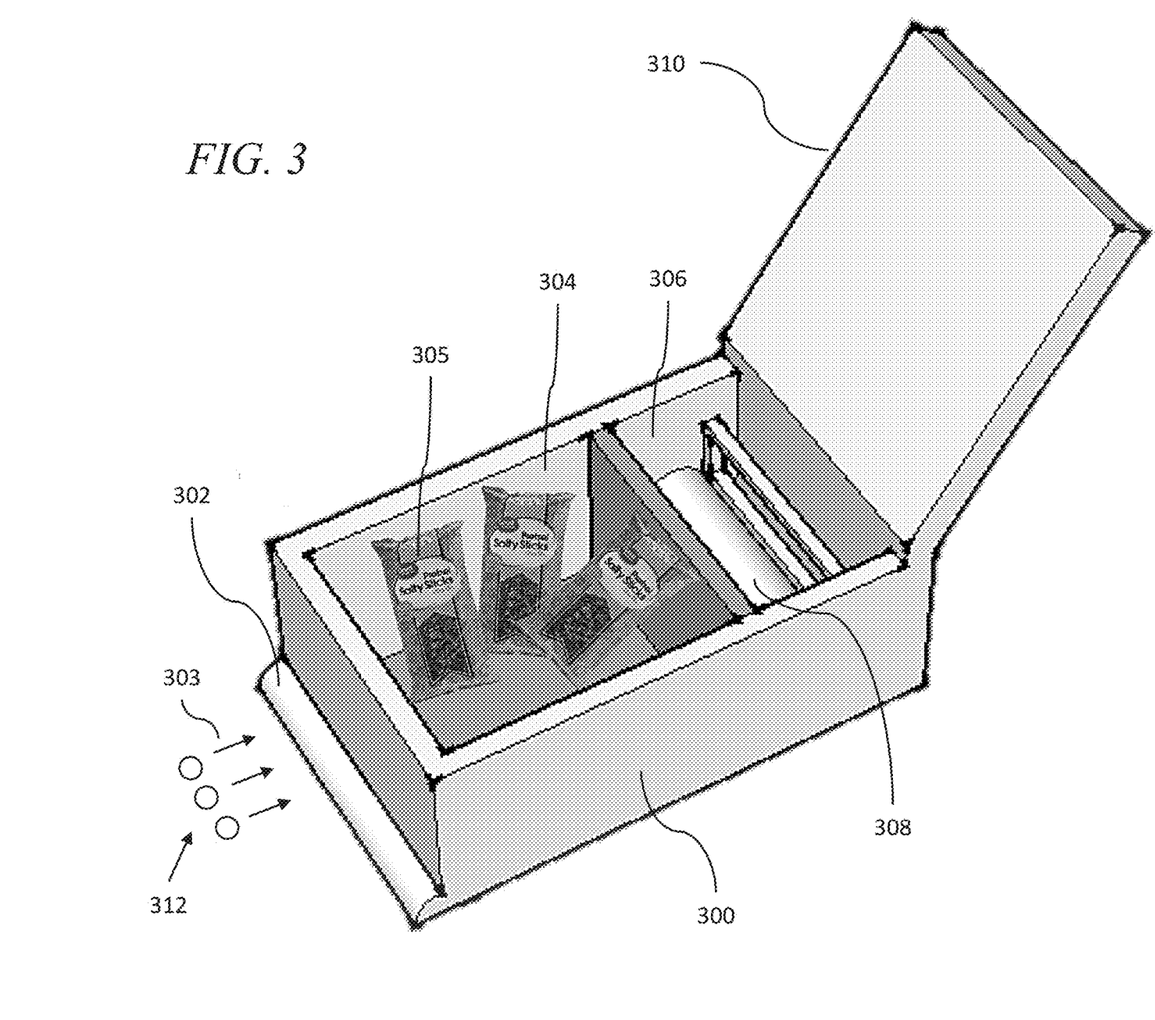
FIG. 3 comprises a diagram of a system as configured in accordance with various embodiments of these teachings.

Referring now to FIG. 3, a carrier 300 that includes product storage and a vacuum unit is described. The carrier 300 is the same dimensions and/or from factor as other carriers that do not have vacuum units and only include storage space.

The carrier 300 includes an intake 302, a product storage area 304 (with products 305), a vacuum chamber 306 with a vacuum unit 308. A debris storage area and debris analysis devices may be included in the vacuum chamber 306 or in other locations at the bottom of the carrier 300. A handle 310 may assist movement of the carrier 300, e.g., by a cart or vehicle. The intake is a structure that collects debris and may extend under the vacuum chamber 306 and allow debris 312 to be vacuumed by the vacuum unit 308 with debris movement in the direction indicated by the arrow labelled 303. As mentioned, a debris storage area may also exist underneath the vacuum chamber 306. Debris analysis devices may also be disposed underneath the chamber and/or within the debris storage area to allow for analysis of the debris 312.

Figure 4:
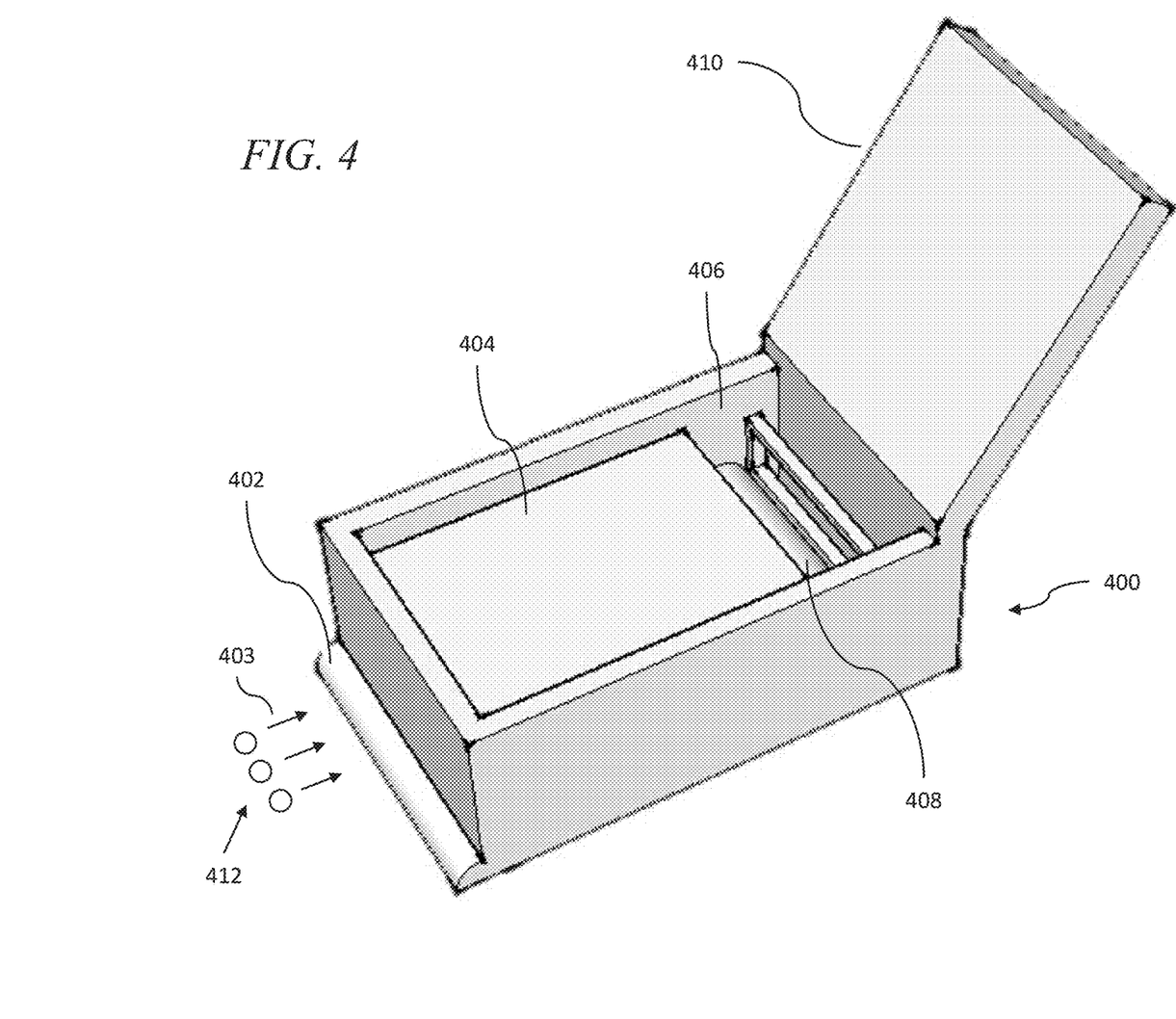
FIG. 4 comprises a diagram of a system as configured in accordance with various embodiments of these teachings.

Referring now to FIG. 4, a carrier 400 that does not include product storage and only acts a vacuum unit is described. The carrier 400 is of the same dimensions and/or from factor as other carriers with vacuum units and storage spaces (e.g., the carrier 300 of FIG. 3).

The carrier 400 includes an intake 402, a debris storage area 404, a vacuum chamber 406 with a vacuum unit 408. A handle 410 may assist movement of the carrier 400, e.g., by a cart or vehicle. The intake 402 couples to the debris storage area 404 and allows debris 412 to be vacuumed by the vacuum unit 408 with debris movement in the direction indicated by the arrow labelled 403. Debris analysis devices may also be disposed within the debris storage area 404 to allow for analysis of the debris. In contrast to the carrier 300, the carrier 400 does not carry any products or items. However, the dimensions (e.g., height, width, and depth) and/or form factor (e.g., shape) of the carrier 400 is the same as that of the carrier 300.

It will be appreciated that the carriers 300 and 400 can be used together to effectively remove substantial amounts of debris from the storage facility. For example, some central controller may determine a schedule, coverage, and/or routes for various carriers of different types (those that move products and those that do not move products). The schedule, coverages, and/or routes (of particular carriers) may be based upon the need for product movement at a particular time (e.g., at certain times more or fewer product movements are occurring), carriers that are out of service for repairs, carriers that are having their debris removed, and/or other factors. Carriers may also coordinate amongst themselves to determine an optimal schedule, coverage, and routes to take through a facility.

Figure 5:
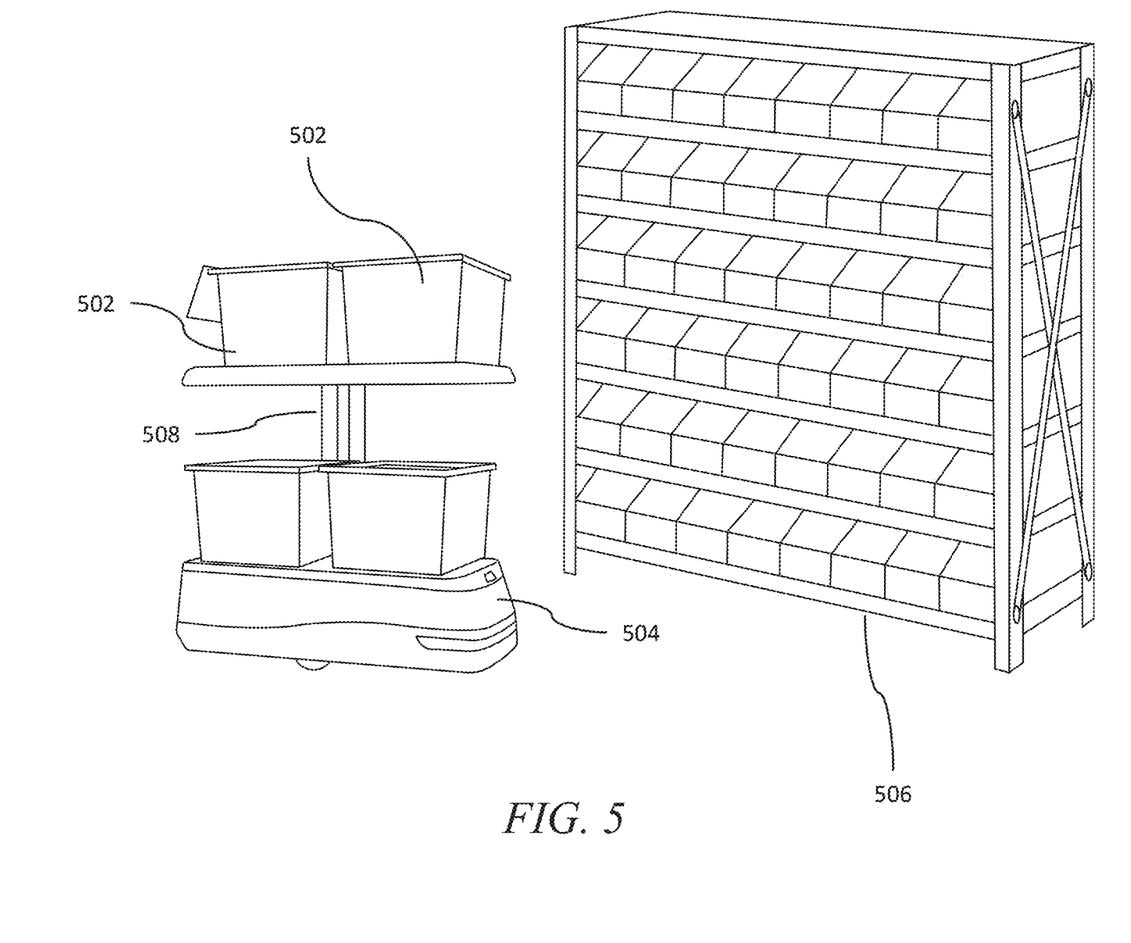
FIG. 5 comprises a diagram of a system as configured in accordance with various embodiments of these teachings.

Referring now to FIG. 5, one example of autonomous carrier movement in a storage facility is described. Carriers 502 are placed on an autonomous vehicle 504, which carries and moves the carrier 502. Carriers 502 are of the types described herein and provide for the removal (and potentially analysis) of debris as they move through the system of FIG. 5. The autonomous vehicle 504 moves along and/or amongst the racks 506. The automated vehicle has a lifting mechanism 508 to move the carriers 502 to a position on the racks 506 (e.g., to a shelf on the racks 506 where the shelf on the racks is above ground level).

Figure 6:
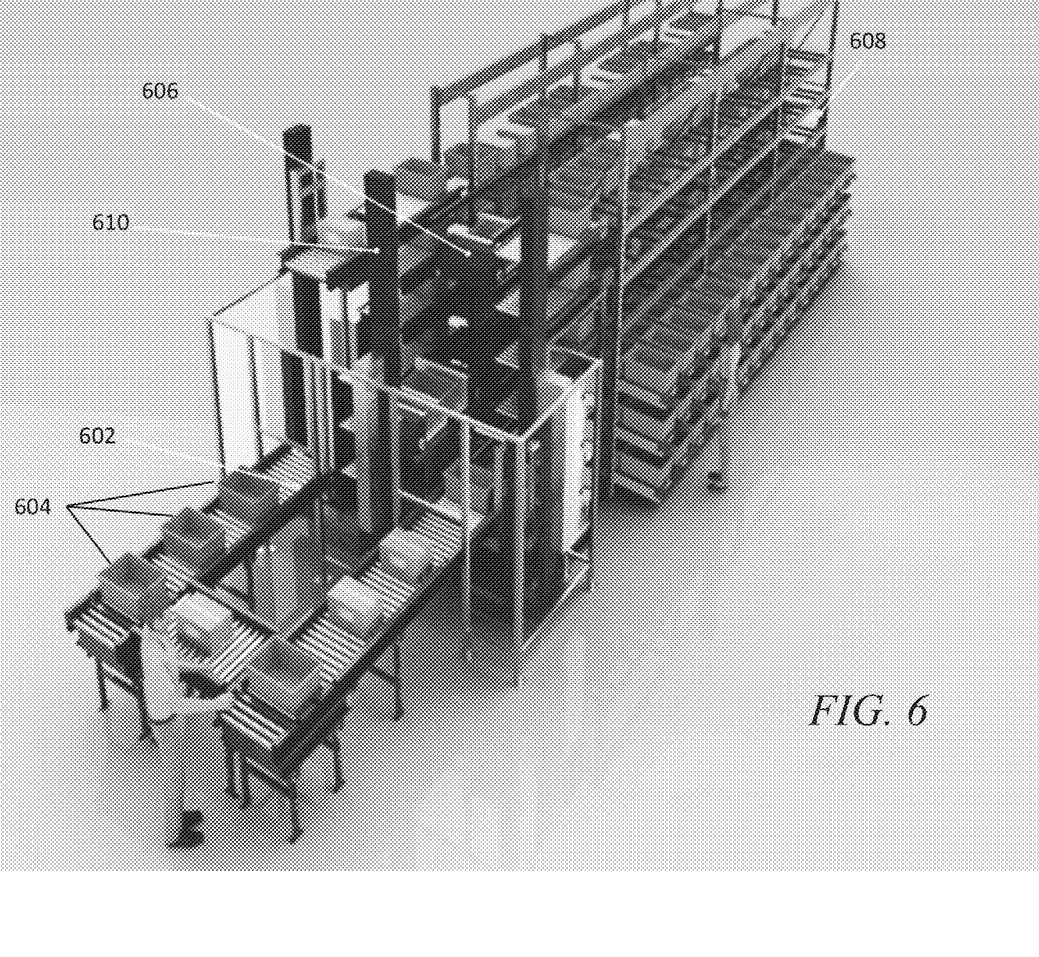
FIG. 6 comprises a diagram of a system as configured in accordance with various embodiments of these teachings.

Referring now to FIG. 6, another example of autonomous carrier movement in a storage facility is described. A conveyor roller 602 provides for horizontal movement of carriers 604 on the ground level of the facility. Independent shuttles 606 operate on or at different levels of a rack 608. In aspects, the shuttles may move within the racks using a rail. Lifts 610 raise the carriers 604 that are to be placed on or attached to the independent shuttles 606. Thus, the lift 610 is at a fixed position within the rack 608 and is responsible for the vertical movement of the carriers 604. The carriers 604 are of the types described herein and provide for the removal (and potentially analysis) of debris as they move through the system of FIG. 6.

Figure 7:
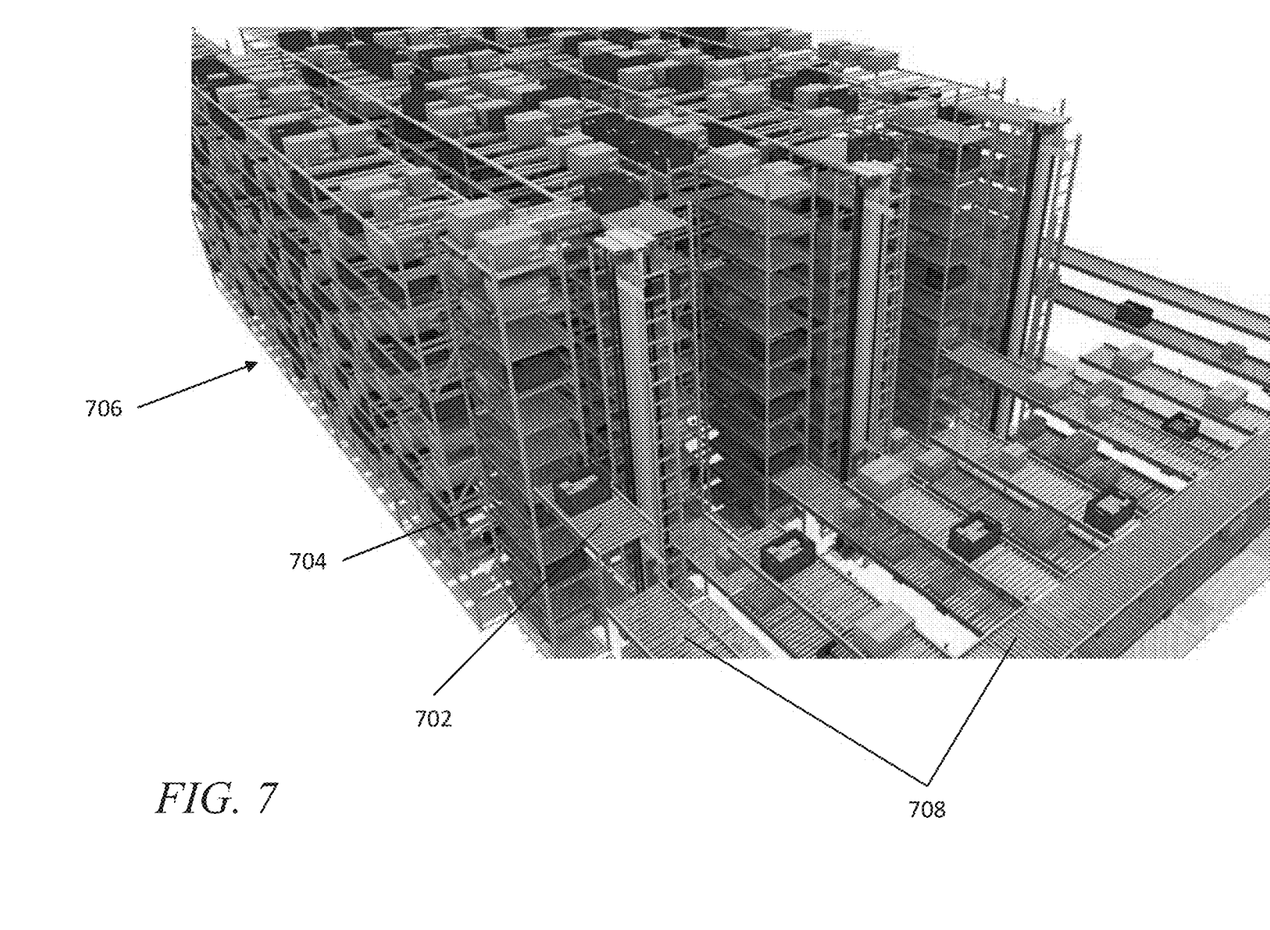
FIG. 7 comprises a diagram of a system as configured in accordance with various embodiments of these teachings.

Referring now to FIG. 7, another example of autonomous carrier movement in a storage facility is described. The system of FIG. 7 includes lifts 702 with carriers 704 that move the carriers to product storage units 706. Conveyor belts 708 also move the carriers 704 to the lifts 702. The carriers 704 are of the types described herein and provide for the removal (and potentially analysis) of debris as they move through the system of FIG. 7.

Figure 8:
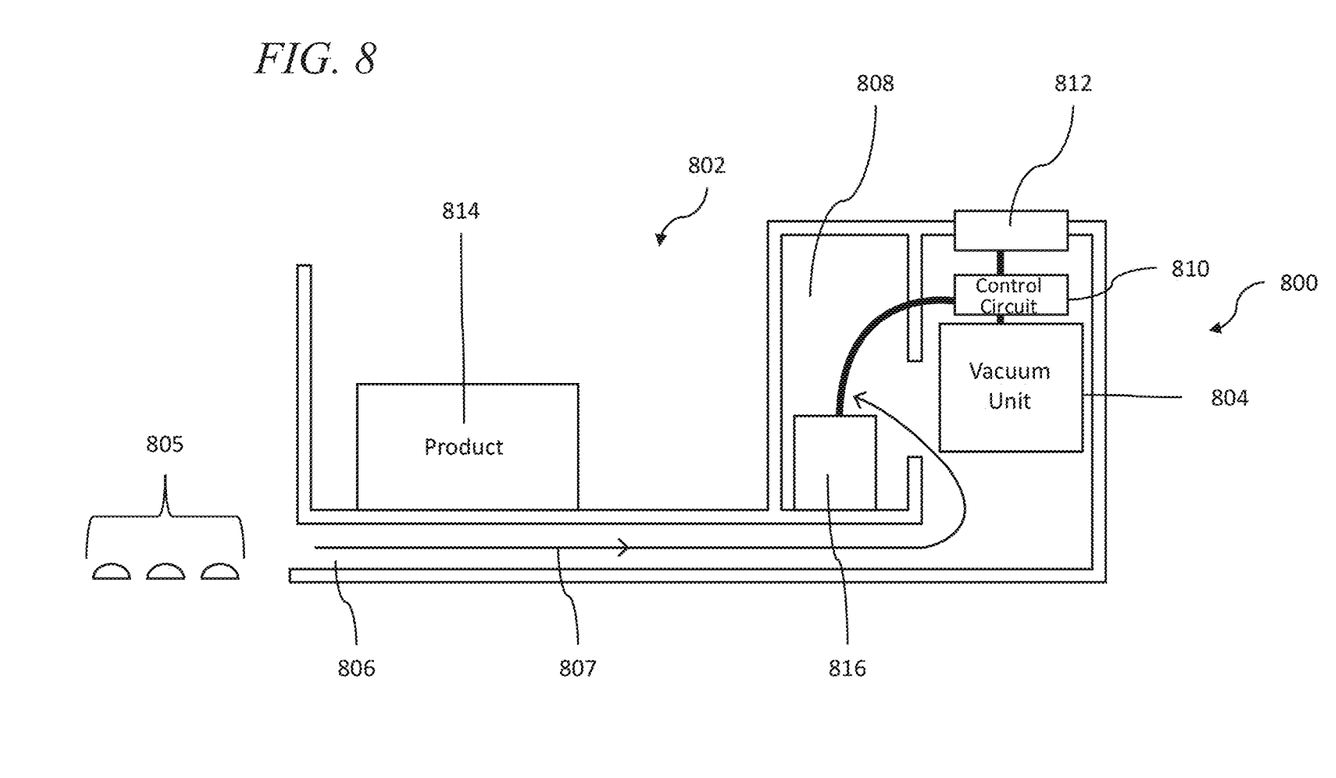
FIG. 8 comprises a diagram of a system as configured in accordance with various embodiments of these teachings.

Referring now to FIG. 8, one example of an autonomous carrier 800 is described. The carrier 800 includes a product storage area 802, a vacuum unit 804, vacuum intake 806, debris chamber 808, a control circuit 810, and a communication device 812. The product storage area 802 is configured to store a product 814. The product 814 can be any type of product with any type of packaging. The area 802 can also be used to store sub-totes that themselves carry products.

It will be appreciated that one or more functions are autonomously performed by the carriers 800. That is, one or more functions are performed without human involvement or intervention, or the involvement or intervention of a central control center (or other control arrangement external to the carrier 800). For example, the carrier 800 may independently navigate to or cause a vehicle carrying the carrier 800 to independently navigate through a warehouse or other storage facility. In another example, the carrier may independently analyze the debris and determine an action to take.

In some other examples, the carrier 800 is both autonomous and controlled. For instance, a vacuum function may be externally controlled, while the carrier itself, once it receives activation (or a schedule) from an external source, may independently navigate through a warehouse or other storage facility.

The control circuit is coupled to the communication device 812. The communication device 812 may include an antenna and/or a transceiver. Communications are received and/or transmitted from the communication device 812. For example, instructions may be received for the vacuum unit 804 to be activated or deactivated. Results of any analysis of the debris (made by an analysis unit 816) can also be communicated to an outside entity. In addition, actions (e.g., alerts) can be sent or instructions to other entities to take actions can be communicated to the outside entity via the communication device 812.

The control circuit 810 is coupled to the vacuum unit 804, the communication device 812, and the analysis unit 816. The analysis unit 816 includes devices or mechanisms to analyse debris in the debris chamber 808. For example, the analysis unit 816 may include mechanisms to detect smoke, contaminants, or determine the chemical composition of debris. In other aspects, the analysis unit 816 includes one or more cameras that obtain images of the debris. The images can be analysed by the control circuit 810 (or sent to another control circuit outside the carrier 800 via the communication device 812). For example, machine learning approaches may be used to analyse the images.

The vacuum intake 806 allows debris 805 to be vacuumed by the vacuum unit 804 along the path labelled with the label 807 from outside the carrier 800 through the vacuum intake 806 and into the debris chamber 808. The debris chamber 808 may have a port (not shown) where debris in the debris chamber 808 may be periodically removed. Once the debris is in the debris chamber 808, the analysis unit 816 and/or the control circuit 810 may analyse the debris and some action may be taken.

In some embodiments, one or more of the exemplary embodiments include one or more localized IoT devices and controllers (e.g., included with or associated with the various devices, sensors, totes, carriers, or vehicles described herein). As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modelled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect genetic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An autonomous carrier for removing debris from a product storage facility, the autonomous carrier comprising:
a product store volume that is configured to store products as the autonomous carrier moves through a storage facility;
a vacuum unit that is configured to remove debris from the product storage facility and place the debris in a debris chamber;
a control circuit coupled to the vacuum unit, the control circuit being configured to selectively actuate the vacuum unit;
wherein autonomous carrier is configured to traverse selected ones of a plurality of pathways, the plurality of pathways being disposed throughout the storage facility, the pathways extending between or around product storage units;
wherein the vacuum unit is configured to remove debris from the pathways as the autonomous carrier traverses the pathways as it carries the products through the storage facility.

2. The autonomous carrier of claim 1, wherein the product store volume includes multiple storage spaces for holding different types of the products.

3. The autonomous carrier of claim 1, wherein the vacuum unit of the autonomous carrier is configured to analyze characteristics of the debris, determine an action to take based upon the analysis, and take the action.

4. The autonomous carrier of claim 3, wherein the characteristics of the debris include the smoke content of the debris, the mold content of the debris, the ozone content of the debris, or the bacteria content of the debris.

5. The autonomous carrier of claim 3, wherein the action is one or more of sending an alert message to an employee of the product storage facility, moving selected one of the products within the facility, or sending a control signal to control an environmental control apparatus within the facility.

6. The autonomous carrier of claim 1, further comprising a propulsion unit to cause the first autonomous carrier to traverse the pathways.

7. The autonomous carrier of claim 1, wherein at least some of the pathways include conveyor belts.

8. The autonomous carrier of claim 1, wherein the pathways include portions of a floor.

9. The autonomous carrier of claim 1, wherein the pathways include an elevated mezzanine and transport rail structure.

10. The autonomous carrier of claim 1, further comprising a sensor, the sensor being configured to obtain an environmental characteristic, the environment characteristic being a temperature, a pressure, or a humidity, wherein the vacuum unit determines whether the sensed characteristic is within a predetermined acceptable range, and when the predetermined characteristic is not within the predetermined acceptable range, an alert is transmitted to an employee of the product storage facility.

11. A method of removing debris from a product storage facility, the method comprising:
storing products in a product store volume of an autonomous carrier, the product store volume being configured to store products as the autonomous carrier moves through a storage facility;
selectively actuating a vacuum unit disposed with the autonomous carrier, the vacuum unit being configured to obtain debris external from the autonomous carrier and place the debris in a debris chamber;
with the vacuum unit actuated, traversing selected pathways of the product facility, removing debris from the pathways as the autonomous carrier traverses the pathways and carries the products through the storage facility, the plurality of pathways being disposed throughout the storage facility, the plurality of pathways extending between or around product storage units.

12. The method of claim 11, wherein the product store volume includes multiple storage spaces for holding different types of the products.

13. The method of claim 11, further comprising the vacuum unit analyzing characteristics of the debris, determine an action to take based upon the analysis, and take the action.

14. The method of claim 13, wherein the characteristics of the debris include the smoke content of the debris, the mold content of the debris, the ozone content of the debris, or the bacteria content of the debris.

15. The method of claim 13, wherein the action is one or more of sending an alert message to an employee of the product storage facility, moving selected one of the products within the facility, or sending a control signal to control an environmental control apparatus within the facility.

16. The method of claim 11, further comprising a propulsion unit to cause the first autonomous carrier to traverse the pathways.

17. The method of claim 11, wherein at least some of the pathways include conveyor belts.

18. The method of claim 11, wherein the pathways include portions of a floor.

19. The method of claim 11, wherein the pathways include an elevated mezzanine and transport rail structure.

20. The method of claim 11, further comprising obtaining an environmental characteristic with a sensor, the environment characteristic being a temperature, a pressure, or a humidity, the method further comprising determining whether the sensed environmental characteristic is within a predetermined acceptable range, and when the predetermined characteristic is not within the predetermined acceptable range, alerting an employee of the product storage facility.

* * * * *